United States Patent [19]
Henke

[11] Patent Number: 4,457,291
[45] Date of Patent: Jul. 3, 1984

[54] POWER BURNER SYSTEM FOR A FOOD PREPARATION OVEN

[75] Inventor: Mitchell C. Henke, Fort Wayne, Ind.

[73] Assignee: Lincoln Manufacturing Company, Inc., Fort Wayne, Ind.

[21] Appl. No.: 407,267

[22] Filed: Aug. 11, 1982

[51] Int. Cl.³ .............................................. A21B 1/00
[52] U.S. Cl. .............................. 126/21 A; 126/39 G; 126/39 E
[58] Field of Search ........................ 431/85, 347, 352; 126/21 A, 52, 39 G, 19 R, 39 E, 273 R; 236/15 A

[56] References Cited

U.S. PATENT DOCUMENTS

| | | | |
|---|---|---|---|
| 2,713,861 | 7/1955 | Biddle et al. | 126/39 G |
| 3,437,085 | 4/1969 | Perry | 236/15 A |
| 3,659,518 | 5/1972 | Porter | 99/386 |
| 3,684,424 | 8/1972 | Zink | 431/347 |
| 3,869,249 | 3/1975 | Frische | 432/121 |
| 3,987,718 | 10/1976 | Lang-Ree | 99/386 |
| 4,089,319 | 5/1978 | Tamada et al. | 126/273 R |
| 4,338,911 | 7/1982 | Smith | 126/21 A |
| 4,354,549 | 10/1982 | Smith | 126/21 A |

FOREIGN PATENT DOCUMENTS 2351072 4/1975 Fed. Rep. of Germany ... 126/21 A
63312 11/1912 Switzerland ..................... 126/39 G

OTHER PUBLICATIONS

Wayne Home Equipment Division Brochure, The Scott and Fetzer Co., 801 Glasgow Ave., Fort Wayne, Indiana, Models P250AF, P250AF-EP and P250AF-DI.

Primary Examiner—Samuel Scott
Assistant Examiner—G. Anderson
Attorney, Agent, or Firm—Albert L. Jeffers; John F. Hoffman

[57] ABSTRACT

A gas power burner system is provided for a commercial-size food preparation oven and generally comprises a gas power burner connected in series by a gas supply line to a mechanical modulating valve and an electrical on-off valve. The electrical on-off valve initiates or terminates gas flow to the mechanical modulating valve and the gas power burner. A temperature sensing device disposed within the oven and operably connected to the mechanical modulating valve senses temperature fluctuations and causes the mechanical modulating valve to selectively vary the gas flow rate to maintain the desired temperature within the food preparation oven.

12 Claims, 6 Drawing Figures

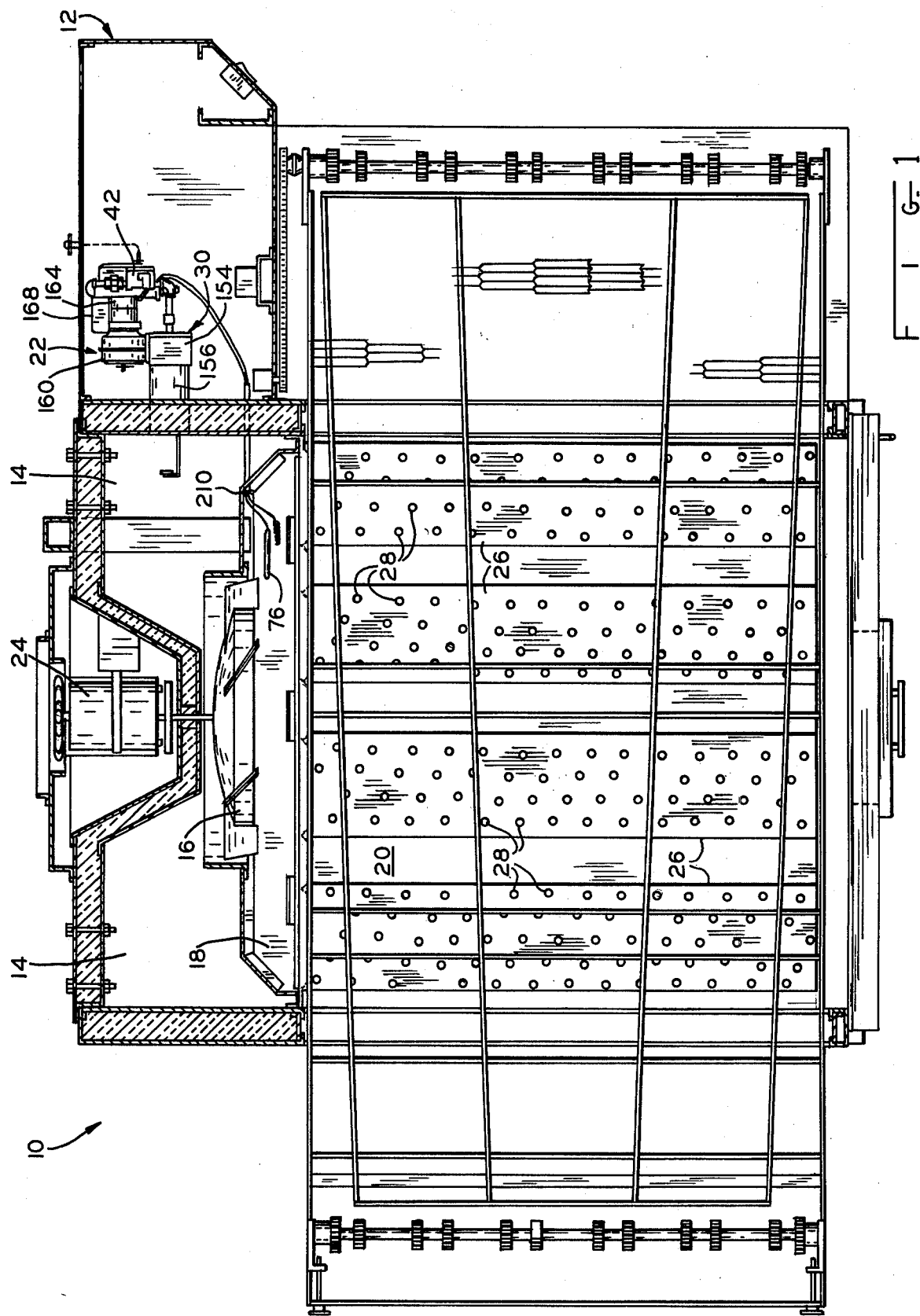

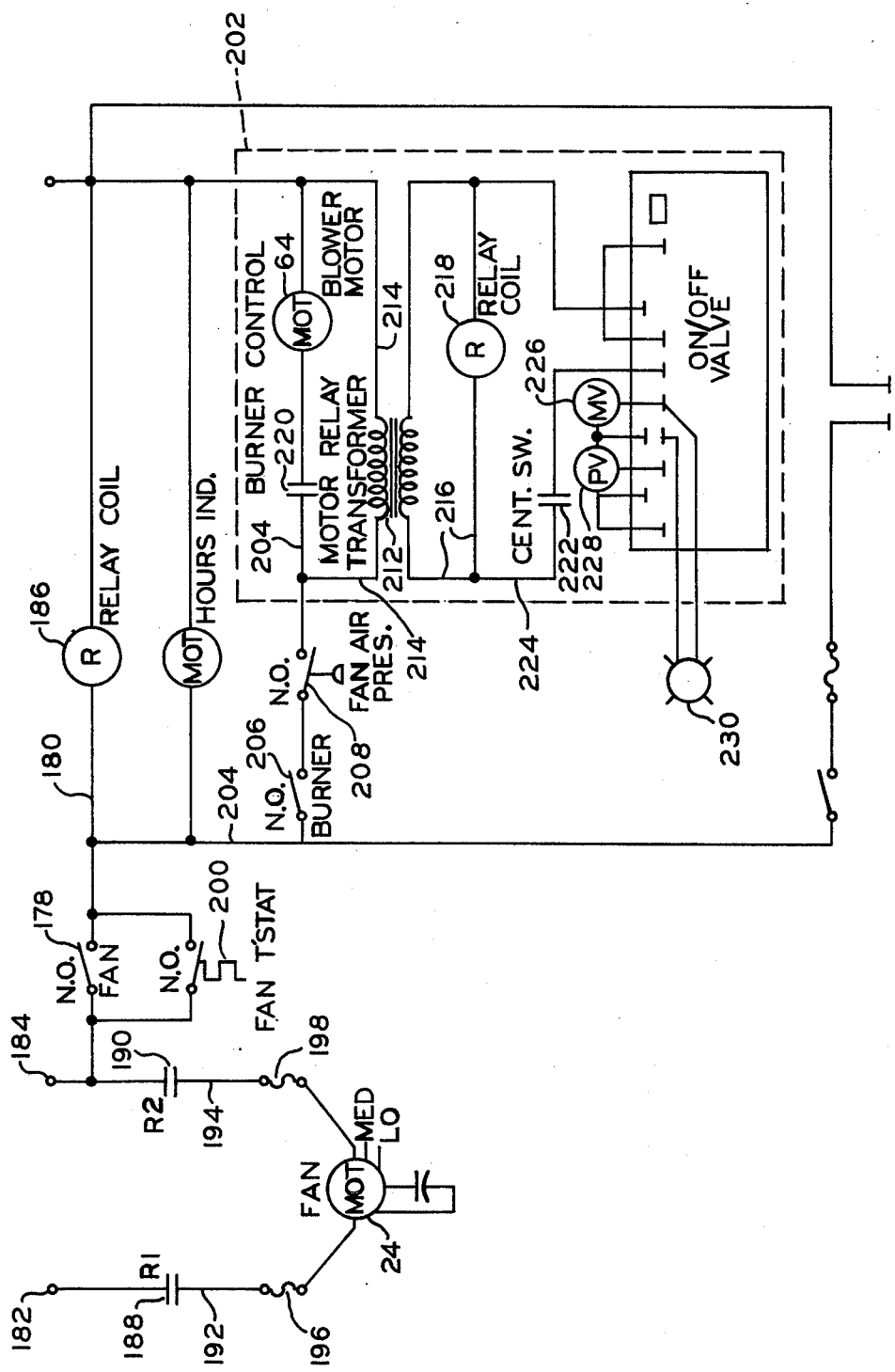

POWER BURNER SYSTEM FOR A FOOD PREPARATION OVEN

BACKGROUND OF THE INVENTION

This invention pertains to a heating system for an oven, and more particularly to a gas power burner system for a commercial-size food preparation oven.

DESCRIPTION OF THE PRIOR ART

Typically, oven heating controls are either mechanical or electrical and during the cooking process generally provide a wide range of fluctuating temperatures between a peak temperature corresponding to the supplied gas flow rate and a lower temperature corresponding to a zero gas flow rate. Some ovens, rather than having a zero gas flow rate, have a minimal gas flow rate which supplies a very low temperature; however, the temperature is essentially ineffective for cooking purposes because of its low value. Regardless of whether the oven has a zero gas flow rate or a minimal gas flow rate, when food is placed in the oven and the desired cooking temperature set, gas is supplied under one flow rate to provide a cooking temperature within the oven. As the temperature in the oven approaches or exceeds the desired temperature, a temperature sensor in the oven will shut the gas flow off or decrease the gas flow to the minimal gas flow rate required. As the temperature in the oven then decreases and reaches a preset lower temperature, the sensor will again activate the flow of gas to permit the temperature to rise with preset cooking temperature limits. With such a heating system, it is apparent that food is cooked by a wide range of fluctuating temperatures due to the fact that the heating system supplies essentially only one effective gas flow rate.

Among the disadvantages of such prior art ovens is the inability to maintain a constant temperature in order to optimally cook the food since the temperature fluctuates within such a large range. Further, the control valve providing the flow of gas tends to prematurely fail due to the constant cycling between "on" and "off".

Directly related to the above problem is that none of these ovens, although they may incorporate a power burner, use a modulating gas flow control valve. Modulating valves have been used in the past, but only with atmospheric burners, such as in a stove surface burner.

Alternatives to the above heating systems that supply only one effective flow rate of gas have either been attempted without resulting in any measurable success, or ignored because of an assumption that such alternatives were impractical or unworkable. For example, it has generally been assumed that a mechanical modulating valve could not be used with a gas power burner because of excessive levels of carbon monoxide and carbon dioxide resulting from combusting low flow rates of gas with excessive oxygen. It was assumed that such excessive levels of carbon monoxide and carbon dioxide would occur upon decreasing the gas flow rate during combustion. In addition, such a system was assumed to burn inefficiently.

SUMMARY OF THE INVENTION

The present invention overcomes the above-described problems and disadvantages associated with the prior art heating systems by providing a gas power burner system that utilizes an electrically controlled on-off valve to supply a flow of gas to a mechanical modulating valve, which supplies to a gas power burner any one of a number of gas flow rates within a selected range of gas flow rates. Therefore, upon selecting a desired temperature for cooking food and energizing the gas power burner system of the present invention, as the cooking temperature within the oven approaches the desired value, the flow of gas is slowly decreased and then stabilized at a substantially constant flow rate corresponding to the selected cooking temperature.

The gas power burner system of the present invention eliminates the continuous cycling between "on" and "off" of the control valve supplying the flow of gas to the oven, thereby preventing its premature failure.

One of the unique features associated with the gas power burner system of the present invention is the discovery by the applicant of being able to decrease the flow rate of gas during combustion without creating unacceptable levels of carbon monoxide and carbon dioxide. Properly adjusted, the gas power burner system may be so operated quite efficiently without causing any sour burning or combustion that might affect the taste of the cooked product.

Stated broadly, the present invention provides, in combination with a food preparation oven having an enclosure for heating food and an impeller device for circulating air in the enclosure, a gas power burner system comprising a gas power burner having a nozzle connected by a gas supply line to a source of combustible gas to be delivered through the nozzle, and a blower device for blowing a stream of air about to nozzle so as to form with the flow of gas a gas-air mixture which, upon combustion, supplies a heat source to heat the air circulated by the impeller device. Connected to the gas supply line between the nozzle and the source of gas is a modulating valve capable of being adjusted to vary the flow rate of gas within a selected range of gas flow rates. In order to provide the proper gas flow rate for the selected temperature, a temperature control device having a temperature sensor in the path of the air circulated by the impeller device, and which is controllably connected to the modulating valve, adjusts the modulating valve to maintain the flow of gas at a rate corresponding to the selected temperature. There is further provided a second valve for terminating or initiating the flow of gas to the modulating valve at the beginning or end of the cooking process, for example, daily.

It is an object of the present invention to provide in combination with a food preparation oven a gas power burner system having a gas power burner, an electrically controlled valve for terminating or initiating gas flow, and a mechanical modulating valve between the burner and electrically controlled valve for adjusting the gas flow to a rate corresponding to a selected cooking temperature in the oven.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawing, wherein:

FIG. 1 is a broken-away top plan view of a food preparation oven incorporating a preferred embodiment of the present invention;

FIG. 6 illustrates the electrical control circuitry of the food preparation oven of FIG. 1.

DESCRIPTION OF A PREFERRED EMBODIMENT

Figure 5:
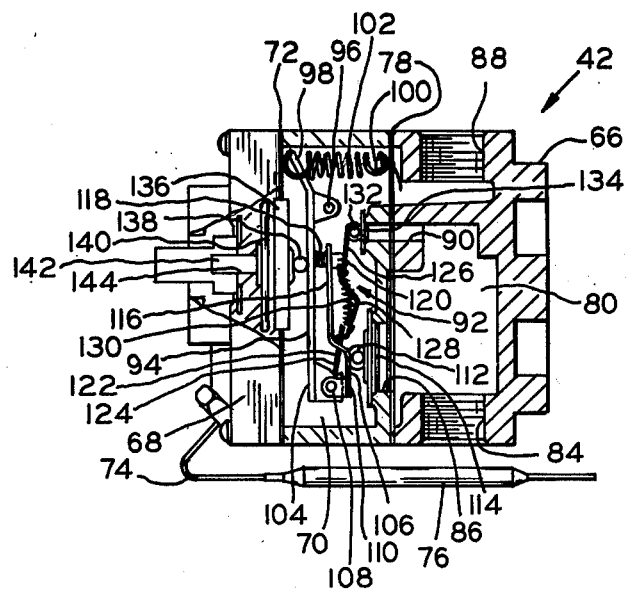
FIG. 5 is a partly broken-away and sectional view of a mechanical modulating valve.

Referring to FIG. 1, a food preparation oven 10 is illustrated and comprises oven control section 12, heating chamber 14, impeller or fan 16, plenum 18, cooking chamber 20, and an incorporated embodiment of the present invention, gas power burner system 22. Fan 16 is operated by fan motor 24, and cooking chamber 20 has a plurality of horizontally disposed heat ducts 26, each of which has a plurality of orifices or jets 28 disposed therein.

The air within food preparation oven 10 is circulated by fan 16 through heating chamber 14, where the air is heated to a desired temperature, and then delivered to plenum 18 for subsequent passage to heat ducts 26. The heated air is then forced through jets 28 against a food product passed therealong. After the heated air has contacted the food product in cooking chamber 20, it is withdrawn by fan 16 back into heating chamber 14 to be reheated and subsequently recirculated to cook other food products.

A more detailed description of the structure and operation of a typical food preparation oven in which gas power burner system 22 may be used can be found in U.S. Pat. Nos. 3,884,213 and 4,154,861; both of the patents being incorporated herein by reference.

Figure 2:
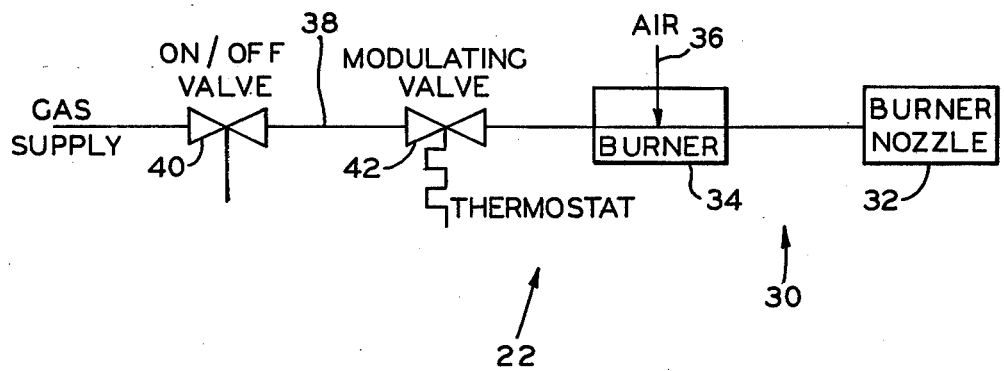
FIG. 2 is a diagrammatic view of a preferred embodiment of the present invention.
Figure 3:
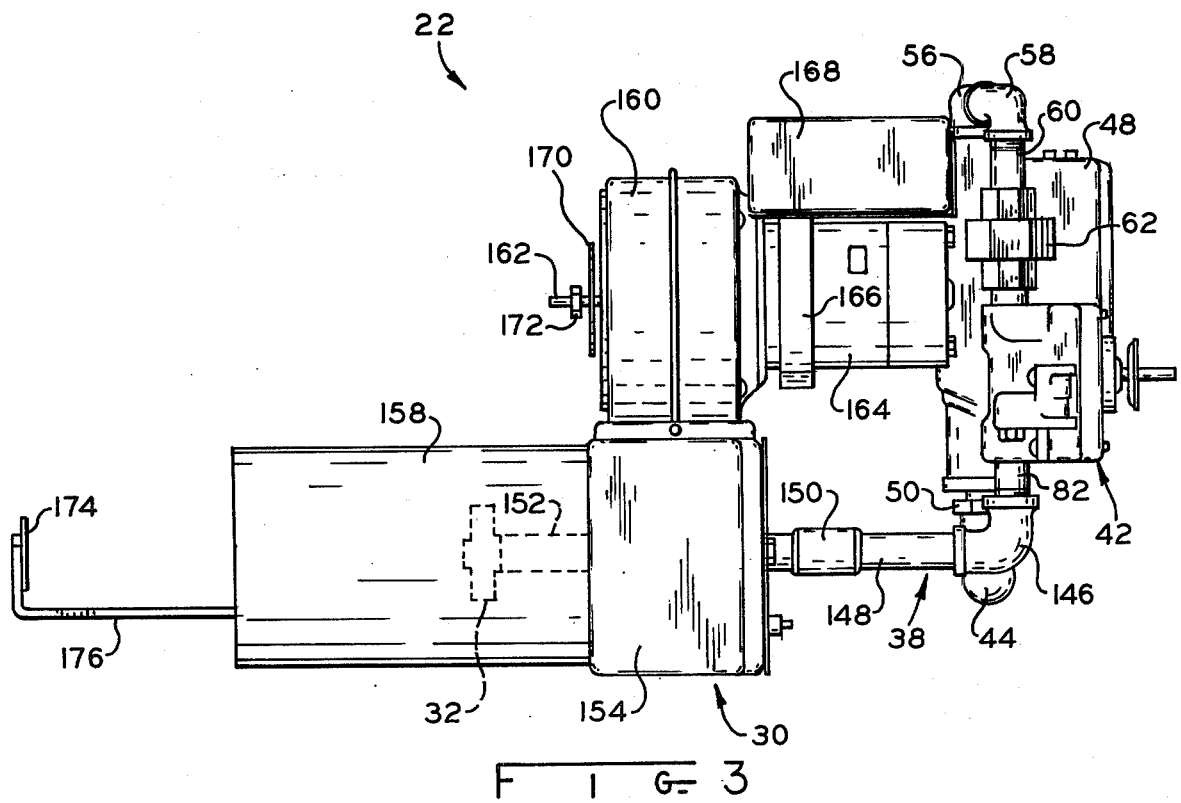
FIG. 3 is a top plan view of a preferred embodiment of the present invention.
Figure 4:
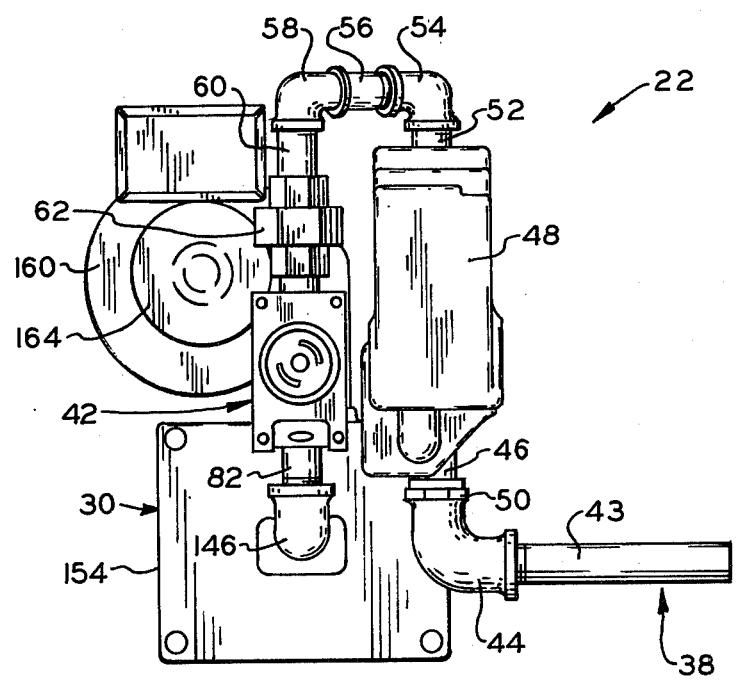
FIG. 4 is a side elevational view of FIG. 3.

Referring now to FIGS. 1 and 2, gas power burner system 22 is mounted within oven control section 12 in order to provide a heat source within heating chamber 14 and generally comprises gas power burner 30 including burner nozzle 32, burner 34, and air supply line 36 connected to a supply of air (not shown). Connecting gas power burner 30 to a source of gas (not shown) is gas supply line 38 having an electrically controlled on-off valve 40 coupled thereto for initiating and terminating gas flow to gas power burner 30. Mechanical modulating valve 42 is also coupled to gas supply line 38 between electrical on-off valve 40 and gas power burner 30 for varying the flow rate of gas to gas power burner 30.

Prior to continuing the description of gas power burner system 22, applicant wishes to distinguish gas power burner 30 utilized in gas power burner system 22 from those atmospheric burners commonly used in household ovens and the like. Some atmospheric burners utilize a modulating valve similar to mechanical modulating valve 42, however, the combustion process is entirely different from that of a gas power burner. Specifically, gas fed through a line to an atmospheric burner combusts upon mixing with the atmospheric air adjacent the burner orifice. The required mixing of the gas and air for combustion occurs in a natural manner unaided by external influences.

In contrast to the natural mixing of gas and air which occurs with atmospheric burners, gas power burner 30 forcibly mixes the gas with air by providing a large air flow rate about the nozzle through which the gas is delivered. A typical air flow rate of approximately 300 cubic feet per minute is supplied by gas power burner 30 to forcibly mix the gas and air, while at the same time causing combustion of the gas-air mixture to occur a substantial distance away from the gas power burner as compared to an atmospheric burner wherein combustion occurs substantially at the burner orifice. By forcibly mixing gas and air, the heat source developed by combustion tends to have an elongated teardrop shape, which is highly desirable for providing a heat source for an area similar to heating chamber 14.

Viewing FIGS. 1, 2, 3 and 4, gas, for example, natural gas, flows through gas line 38, nipple 43, elbow 44, and nipple 46 to control valve 48. Elbow 44 is connected to nipple 46 and control valve 48 by reducer bushing 50, and control valve 48 serves to filter and regulate gas flow to the pilot valve, main valve, spark control, and ignition control (not shown). Control valve 48 may be a control valve such as that manufactured by Johnson Controls, Inc., Watertown, Wis.

From control valve 48, the gas passes through nipple 52, elbow 54, nipple 56, elbow 58, and nipple 60 to union 62. Union 62 provides communication between nipple 60 and mechanical modulating valve 42 for the gas flow.

Referring now to FIG. 5, mechanical modulating valve 42 is illustrated and is a Robertshaw mechanical modulating valve, Model FDTH and is calibrated to supply a plurality of gas flow rates to gas power burner 30 corresponding to a temperature range of from about 300° F. to about 650° F. In addition, electrical control valve 48 has an electrical safety circuit, hereinafter more fully described, which shuts off the flow of gas to gas power burner 30 if the temperature within heating chamber 14 becomes excessive or if fan 16 is not rotating.

Mechanical modulating valve 42 has external housing 66 which is divided into pressure cavity 68 and gas activity 70 by stainless steel diaphragm 72. In communication with pressure cavity 68 via tube 74 is temperature bulb 76, which is disposed within plenum 18. Pressure cavity 68, tube 74, and temperature bulb 76 are filled with a fluid which expands or contacts when heated or cooled, respectively. For example, as the temperature increases in plenum 18, the fluid will expand in bulb 76, tube 74, and fluid cavity 68, thereby causing stainless steel diaphragm 72 to be moved to the right as viewed in FIG. 5. The reverse naturally occurs when the temperature decreases in plenum 18 causing the fluid to contract and stainless steel diaphragm 72 to move to the left. If desired, valve 42 could be of the electrically operated type.

Gas cavity 70 includes inlet chamber 78 and outlet chamber 80 which communicates with nipple 82 (FIGS. 3 and 4) through gas outlet 84. Inlet chamber 78 and outlet chamber 80 are in communication one with the other through opening 86 in housing 66. Gas inlet 88, which like gas outlet 84 is disposed in external housing 66, permits communication between union 62 and gas cavity 70. A second path of communication between inlet chamber 78 and outlet chamber 80, in addition to opening 86, is passage 90.

Gas flow control mechanism 92 is mounted within cavity 70 and controls the flow of gas from gas inlet chamber 78 through passage 90 and opening 86 into outlet chamber 80 and gas outlet 84. Gas flow control mechanism 92 comprises main lever arm 94 pivotably connected to pivot pin 96 and which has its end 98 connected to stationary tab 100 by compression spring 102, which exerts against end 98 a force toward tab 100, i.e., end 98 is biased in a direction toward tab 100. The opposite end 104 of main lever arm 94 has secondary lever arm 106 hingedly connected thereto by pivot pin 108. Lower portion 110 of secondary lever arm 106 is joined to protuberance 112 of throttle disc 114 seated in opening 86. When fully seated within opening 86, throttle disc 114 prevents communication between gas cavity 70 and outlet cavity 80 through opening 86.

Secondary lever arm upper portion 116, which is substantially parallel to main lever arm 94, is biased away from main lever arm 94 by expansion spring 118 disposed therebetween, which tends to move upper portion 116 toward the righthand side of FIG. 5. Projection 120 extends outwardly from upper portion 116 in a direction opposite expansion spring 118.

A third lever arm 122 is also hingedly connected to pivot pin 108 and comprises a bottom portion 124 and a top portion 126 joined together by spring 128 and flexible bent arm 130. Top portion 126 is joined to protuberance 132 of bypass disc 134 which seats within passage 90, and, upon being fully seated within passage 90, bypass disc 134 prevents communication between gas cavity 70 and outlet cavity 80 through passage 90. Projection 120 of secondary lever arm 106 is joined to or in contact with top portion 126.

Control disc 136 is mounted within stainless steel diaphragm 72 such that pressure cavity 68 remains sealed from gas cavity 70, and has protuberance 138, which is secured to the side of control disc 136 disposed in gas cavity 70 and joined to main lever arm 94 such that pivot pin 96 is between compression spring 102 and protuberance 138. Adjusting disc 140 is coupled to the opposite side of control disc 136 and has connected thereto adjusting screw 142 which is threadedly received through opening 144. The threaded engagement of adjusting screw in opening 144 is accomplished in a manner that prevents fluid from escaping gas cavity 70 through opening 144.

Gas flowing through gas outlet 84 then passes through nipple 82, elbow 146, nipple 148, and orifice holder 150. Thereafter, the gas is delivered through nozzle conduit 152 disposed in burner housing 154 to burner nozzle 32 in burner tube 158. The flow rate of gas through burner nozzle 32 may be varied between 40,000 BTU/HR. and 120,000 BTU/HR.

Mounted on and in communication with burner housing 154 is blower housing 160, which is of squirrel cage design. The fan is rotated by motor 164, which is secured by bracket 166 within oven control section 12. Controls for motor 164 are mounted in motor control box 168 connected to bracket 166. The quantity of air delivered by blower housing 162 to burner housing 154 is controlled by air shutter 170 connected to threaded shaft 162 and which is disposed over an opening (not shown) in blower housing 160. Control of the volume flow rate of air through the opening (not shown) in blower housing 160 is accomplished by adjusting air shutter 170 on threaded shaft 162 and securing it in position by lock nut 172, which is threadedly engaged to threaded shaft 162. Preferred volume flow rates of air are from about 100 cubic feet per minute to about 350 cubic feet per minute.

A circular-shaped flame spreader 174 is positioned in the path of the gas-air mixture exiting burner tube 158 and is maintained in position by bracket 176 connected to burner tube 158. Bracket 176 may also be connected to a structural member of food preparation oven 10; the primary purpose of bracket 176 being to support flame spreader 174 in the proper position relative to the flow of the gas-air mixture exiting burner tube 158.

Referring to the figures, and particularly FIG. 6, the operation of gas power burner system 22 in conjunction with food preparation oven 10 will be explained. An on-off switch 178 for operating fan 16 is normally open as depicted in FIG. 6. By closing on-off switch 178 in line 180, voltage applied across terminals 182, 184 will energize relay coil 186, which will close relays 188, 190 in lines 192, 194, respectively, to allow current to flow through fuses 196, 198, respectively, to fan motor 24. Fan motor 24 then rotates fan 16 in plenum 18. Fan thermostat 200 is connected in parallel with on-off switch 178 to prevent fan motor 24 from being shut down when the temperature within plenum 18 is above 200° F. This safety feature provided by fan thermostat 200 prevents fan motor 24 from overheating should on-off switch 178 be opened when excessive temperatures exist within plenum 18.

Burner control 202 is connected to line 180 by line 204, which has burner on-off switch 206 and air pressure safety switch 208 connected in series thereto. Burner switch 206 is normally in the open or off position and is closed to connect burner control 202 to line 180. However, air pressure safety switch 208, which is coupled to pressure sensing element 210 in plenum 18, will prevent the flow of current through line 204 to burner control 202 if pressure sensing element 210 does not sense air pressure within plenum 18 created by the rotation of fan 16. Therefore, should fan 16 stop rotating due to on-off switch 178 being opened or failure of fan motor 24, pressure sensing element 210 will sense the lack of air pressure in plenum 18 and cause air pressure safety switch 208 to open, thereby disconnecting burner control 202 from line 180 and preventing the flow of gas.

Assuming that fan motor 24 rotates fan 16 upon closing on-off switch 178, and burner on-off switch 206 and air pressure safety switch 208 are closed to provide current through line 204 to burner control 202, transformer 212 coupled to line 214, which is connected to line 204, reduces the voltage to create an electrical current in line 216 which activates relay coil 218 to close relay 220 in line 204 to thereby provide electic current for the operation of blower motor 164. Blower motor 164 then operates the squirrel cage blower within blower housing 160 to provide a forced flow of air through burner housing 154 and about burner nozzle 32. However, gas will not flow from burner nozzle 32 until centrifugal switch 222, which is coupled to blower motor 164, senses activation of blower motor 164 to close line 224 to cause gas to be delivered to main valve 226. A continuous flow of gas is provided to pilot valve 228 regardless of the position of centrifugal switch 222. A burner indicator light 230 is provided to be illuminated when burner control 202 is activated and the flow of gas is initiated. The preferred voltage for the operation of food preparation oven 10 is 120/280–240 VAC/-single phase.

After burner control 202 has been activated to provide a flow of gas, the gas flows through gas line 38 to nipple 43, elbow 44, and nipple 46 to control valve 48, which filters and regulates the flow of gas to pilot valve 228, main valve 226, and spark control, ignition control (not shown). Thereafter, the gas flows as earlier described to mechanical modulating valve 42.

Referring not to FIG. 5, the operator of food preparation oven 10 will select the desired temperature between about 300° F. and about 650° F. by turning adjusting screw 142. Upon turning adjusting screw 142, adjusting disc 140 will move control disc 136 to the left or the right as pictured in FIG. 5 so as to properly adjust diaphragm 72 and main lever arm 94 for the desired gas flow rate corresponding to the selected temperature.

Gas will flow through gas inlet 88 of mechanical modulating valve 42 and pass into gas cavity 70 from which a small flow of gas is permitted through passage 90 by bypass disc 134 into outlet cavity 80 and a gas outlet 84. A minimum rate of gas flow is desired to permit continuous operation of burner 34 (FIG. 2).

Further assuming that a low temperature exists in plenum 18, the fluid within temperature sensing bulb 76, tube 74, and cavity 68 will be in a somewhat contracted state so that the reduced gas pressure within chamber 68 causes stainless steel diaphragm 72 to be moved to the left causing control disc 136 and protuberance 138 to similarly move, thereby allowing compression spring 102 to draw end 98 of main lever arm 94 to the right and the opposite end 104 to the left. As opposite end 104 moves to the left, secondary lever arm lower portion 112 will also be drawn to the left thereby withdrawing throttle disc 114 out of its fully seated position in opening 86 to allow gas to flow from inlet chamber 78 through opening 86 into outlet chamber 80 and gas outlet 84.

As the temperature within plenum 18 approaches the selected temperature, the fluid within bulb 76, tube 74, and chamber 70 will begin to expand and thereby move stainless steel diaphragm 72 toward the right as viewed in FIG. 5. This will decrease the gas flow in order to maintain the flow of gas at a rate corresponding to the selected temperature. Upon expansion of the fluid within fluid cavity 68, stainless steel diaphragm 72, control disc 136 and protuberance 138 will move to the right and exert a force in that direction against main lever arm 94. As main lever arm opposite end 104 moves to the right, secondary lever arm lower portion 110 similarly moves, thereby also moving throttle disc 114 to the right to restrict the flow of gas through opening 86 to a rate corresponding to the selected temperature.

As the gas flows through gas outlet 84, it passes through nipple 82, elbow 146, nipple 148, and to orifice holder 150 to be delivered through nozzle conduit 152 and burner nozzle 32. At this instance, the gas forcibly exiting burner nozzle 32 and the air-stream forcibly passing about burner nozzle 32 will mix to form a gas-air mixture having a substantially elongate teardrop shape. Because the gas and air are mixed under a high flow rate, combustion of the gas-air mixture will occur such that the heat source created by the combustion will be substantially centered about flame spreader 174. Flame spreader 174 serves to shape the substantially elongated teardrop heat source into a substantially spherical heat source within heating chamber 14.

The spherically-shaped heat source created by gas burner system 22 will heat the air in heating chamber 14, which will then be drawn by fan 16 into plenum 18 for delivery through heat ducts 26 and jets 28 against a food product. Thereafter, the cooler air will then be drawn by fan 16 through heating chamber 14 to be reheated for subsequent recirculation. As described above, temperature bulb 76 (FIG. 1) continuously senses the temperature within plenum 18 to ensure that the gas flow rate delivered by mechanical modulating valve 42 corresponds to the temperature selected with adjusting screw 142.

In summary, gas power burner system 22 supplies a variety of gas flow rates having clean combustion characteristics, which satisfy the regulations of standards agencies, for example, AGA. A unique feature is the combustion of a commercial-size food preparation oven 10 and a gas power burner system 22 having a mechanical modulating valve capable of providing gas flow rates corresponding to temperatures between approximately 300° F. and 650° F., and heat quantities between approximately 50,000 BTU's and 120,000 BTU's. Further, quicker response time to temperature fluctuations within plenum 18 is provided by the capability of mechanical modulating valve 42 to vary the gas flow rate to gas power burner 30. This further results in less energy consumed by food preparation oven 10, and a better food product because of the substantially constant temperature maintained in plenum 18.

While this invention has been described as having a specific embodiment, it will be understood that it is capable of further modifications. This application is therefore intended to cover any variations, uses or adaptations of the invention following the general principles thereof, and including such departures from the present disclosure as come within known or customary practice in the art to which this invention pertains and fall within the limits of the appended claims.

What is claimed is:

1. In a food preparation oven including a chamber means for heating food and impeller means for circulating air in said chamber means, a gas power burner system, comprising:

a gas power burner having nozzle means connected by a gas supply line means to a source of combustible gas to deliver a flow of gas through said nozzle means, and blower means for blowing about said nozzle means a stream of air to form with the flow of gas from said nozzle means a gas-air mixture, whereby, upon combusting the gas-air mixture, a heat source is provided to heat air to be circulated by said impeller means, modulating valve means connected in said gas supply line means between said nozzle means and the source of gas and being adjustable to vary the flow rate of gas through said nozzle means within a selected range of gas flow rates, temperature control means having a temperature sensor in the path of the air circulated by said impeller means and being controllably connected to said modulating valve means for adjusting said modulating valve means to maintain the flow of gas at a rate corresponding to a selected temperature, and second valve means for selectively initiating or terminating the flow of gas to said gas power burner.

2. The oven of claim 1 further including flame shaping means disposed in the path of a gas-air mixture to be combusted for forming the resulting heat source into a pattern having a desired temperature distribution therein.

3. The oven of claim 2 wherein said flame means comprises a shaped plate member disposed in and generally perpendicular to the path of a gas-air mixture to be combusted and a support member connecting said shaped plate member to said gas power burner.

4. The oven of claim 3 wherein said shaped plate member is disposed within said chamber means and said gas power burner is disposed without said chamber means.

5. The oven of claim 1 wherein said modulating valve means is mechanically operated.

6. The oven of claim 5 wherein said modulating valve means comprises a movable diaphragm member dividing said modulating valve means into first and second chambers, said second chamber being in communication with said gas supply line means through a gas inlet, and a gas outlet connected to said second chamber, and gas flow control means disposed in said second chamber between said gas inlet and said gas outlet and being operably connected to said movable diaphragm to vary the flow of gas through said second chamber, and wherein said sensor has an interior space communicating with said first chamber, said interior space and said first chamber being adapted to contain a volume of fluid which expands on heating and contracts on cooling to move said diaphragm and operate said gas flow control means to provide a gas flow rate corresponding to a selected temperature.

7. The oven of claim 6 wherein said modulating valve means is adjustable to deliver a plurality of gas flow rates within the selected range of gas flow rates.

8. The oven of claim 1 wherein said second valve means is electrically operated.

9. The oven of claim 1 wherein said oven is an impingement-type oven having a plurality of heat duct members disposed in said chamber means for receiving circulated air from said impeller means, said heat duct members each having a plurality of openings therein for directing the circulated air against a food product.

10. The oven of claim 1 wherein said temperature sensor and the heat source are on opposite sides of said impeller means.

11. The oven of claim 1 wherein said second valve means is connected in said gas supply line means between said modulating valve means and the source of combustible gas.

12. The oven of claim 1 wherein said modulating valve means is adjustable to deliver a plurality of gas flow rates within the selected range of gas flow rates.

* * * * *

UNITED STATES PATENT AND TRADEMARK OFFICE
CERTIFICATE OF CORRECTION

PATENT NO. : 4,457,291
DATED : July 3, 1984
INVENTOR(S) : Mitchell C. Henke

It is certified that error appears in the above—identified patent and that said Letters Patent is hereby corrected as shown below:

Col. 2, line 31, change "to" to --the--
Col. 4, line 36, change "activity" to --cavity--
Col. 6, line 67, change "not" to --now--
Col. 8, line 7, change "combustion" to --combination--
Cl. 3, Col. 8, line 62, insert --shaping-- after "flame"

Signed and Sealed this

Twenty-fifth Day of December 1984

[SEAL]

Attest:

Attesting Officer

GERALD J. MOSSINGHOFF

Commissioner of Patents and Trademarks